T. F. PHARO.
WATER AGITATOR.
APPLICATION FILED JULY 1, 1911.
1,055,980.
Patented Mar. 11, 1913.
2 SHEETS—SHEET 2.
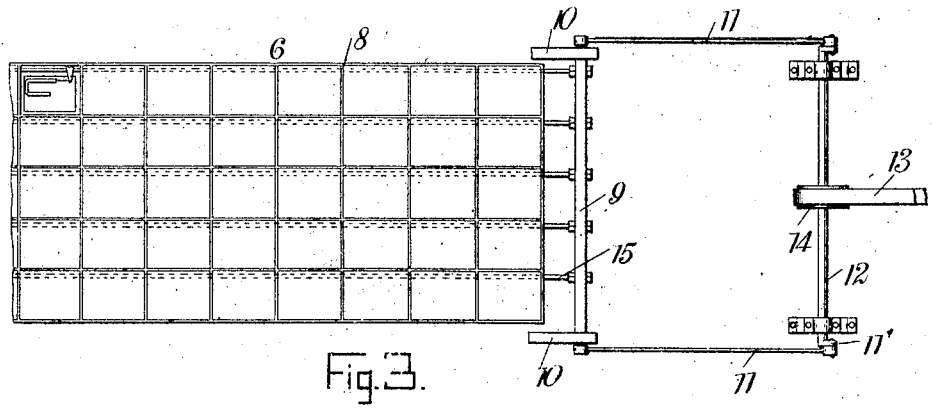
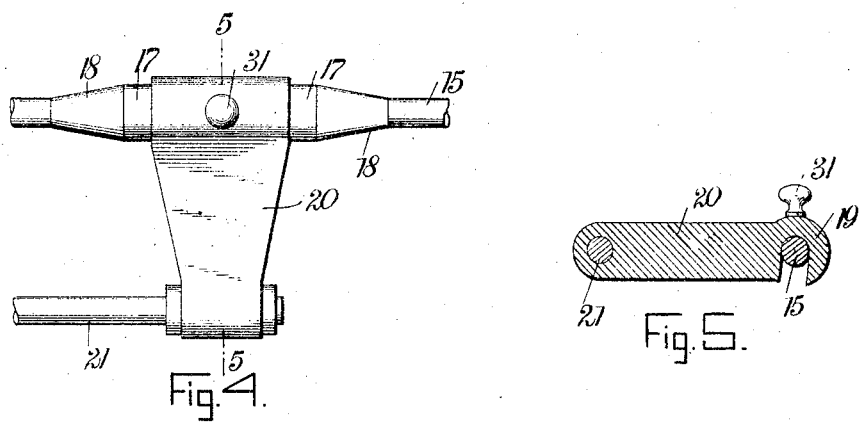
WITNESSES
INVENTOR
Timothy Frank Pharo
BY
ATTORNEYS

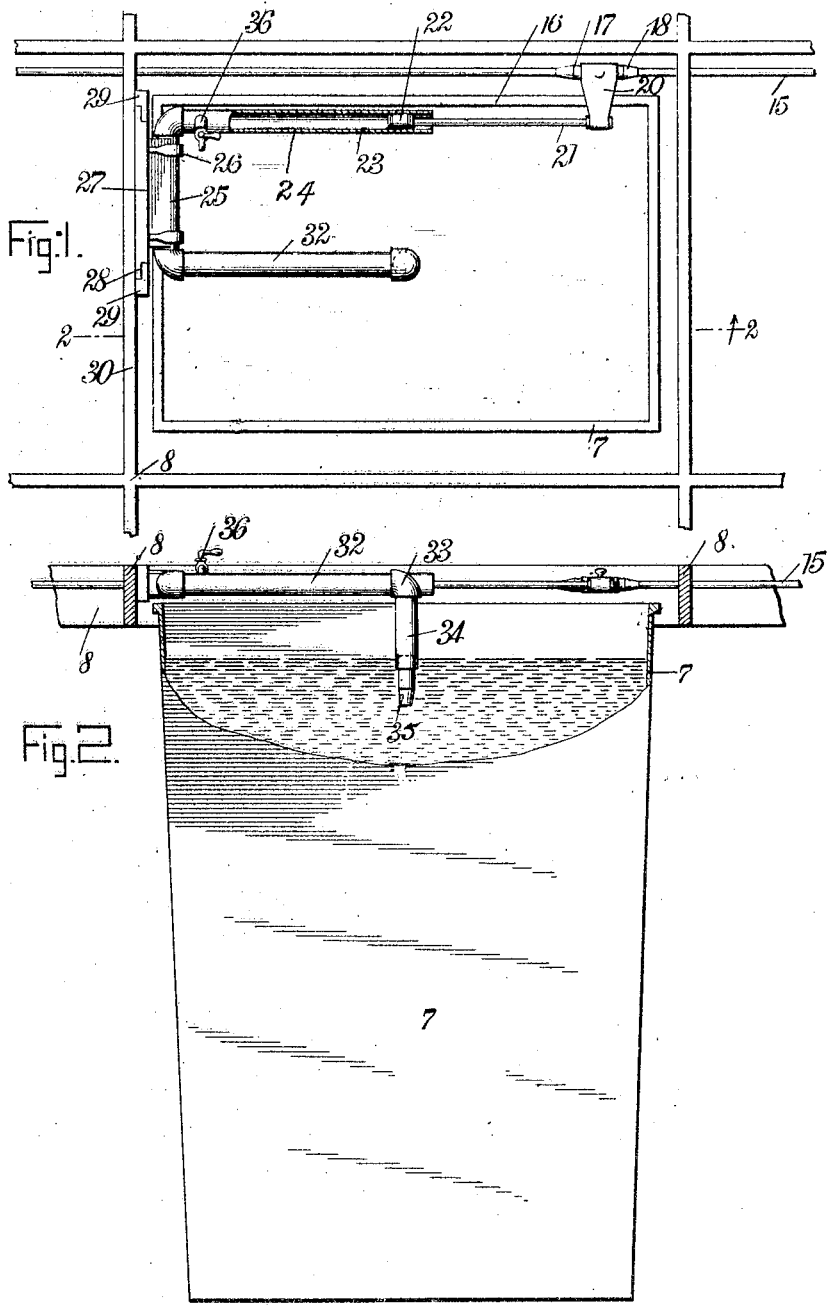

UNITED STATES PATENT OFFICE.

TIMOTHY FRANKLIN PHARO, OF TUCKERTON, NEW JERSEY.

WATER-AGITATOR.

1,055,980.
Specification of Letters Patent.
Patented Mar. 11, 1913.

Application filed July 1, 1911. Serial No. 636,389.

*To all whom it may concern:*

Be it known that I, TIMOTHY FRANKLIN PHARO, a citizen of the United States, and a resident of Tuckerton, in the county of Ocean and State of New Jersey, have invented a new and Improved Water-Agitator, of which the following is a full, clear, and exact description.

This invention relates to a water agitator, and is particularly adapted to agitate the water in the manufacture of artificial ice. In the manufacture of ice, it has been found desirable to agitate the water in order to dissolve the air bubbles therein, so as to form a clear transparent ice without air bubbles.

An object of my invention is to provide an economical means for agitating the water without in any way interfering with the operation of the ice plant.

A further object of my invention is to provide an agitator which may readily be disconnected from the ice and may be swung out of the way, so as not to interfere with the ice in the freezing cans.

I attain the above indicated objects by disposing the outlet of a single-acting pump just below the surface of the water, and provide means for actuating said pump whereby water is drawn thereinto and then forced to the bottom of the water. This pump is so disposed relative to the framework, that it may be raised out of the way, so as not to interfere with the removal of the refrigerating cans.

With the above and other objects in view, as will more fully hereinafter appear, the present invention consists in certain novel details of construction and arrangement of parts hereinafter fully described, illustrated in the accompanying drawings, and more particularly pointed out in the appended claims.

Reference is to be had to the accompanying drawings, forming a part of this specification, in which similar characters of reference indicate corresponding parts in all the figures, and in which—

Figure 1 is a plan view of a single freezing can with the agitator in position; Fig. 2 is a transverse sectional view taken on the line 2—2 of Fig. 1 and looking in the direction of the arrow; Fig. 3 is a plan view showing a battery of freezing cans and showing the pump piston rod actuating means; Fig. 4 is an enlarged plan view showing the connection between the piston rod and the power rods; Fig. 5 is a transverse sectional view taken on the line 5—5 of Fig. 4.

As shown more particularly in Fig. 3, I have provided a battery 6 of freezing cans 7, each of which cans is disposed within the framework 8 and individually adapted to be removed therefrom. Beyond one end of the battery 6 and extending transversely thereof, is a reciprocating bar 9, pivotally affixed to the opposite ends of which are guide bars 10. The reciprocating bar 9 is connected by means of connecting rods 11 to the cranks 11' of a power shaft 12, which power shaft is actuated by a belt 13 passing over a pulley 14 on the power shaft. Rigidly affixed to the bar 9 and extending lengthwise along the battery of cans, one to each line of cans, is a series of reciprocating rods 15. While the agitator will be described with reference to but one of these cans, it is to be understood that this arrangement is duplicated for each can in the battery.

The reciprocating rods 15 extend through the framework 8 and are disposed between one side 16 of the can 7 and the adjacent side of the framework 8. Adjacent one end of the can, there is mounted upon the rod 15, a pair of spaced apart sleeves 17, the outer ends of which are beveled, as shown at 18. Adapted to engage the rod 15 between the sleeves 17, is a hook 19 on the end of a broad connecting arm 20, which arm is pivoted opposite the hook end, to one end of a piston rod 21, the other end of which has mounted thereon a piston 22 slidably mounted in a cylinder 23, which cylinder constitutes one leg of a U-shaped pump 24, the crotch 25 of which pump is fastened by means of staples 26 to a bracket 27, having reduced ends 28 adapted to fit in the rear of an L-shaped support 29, rigidly fastened to an end piece 30 of the framework 8.

By means of this construction, it is possible to disconnect the piston rod 21 from the reciprocating rod 15, by lifting the arm 20 by means of the handle 31, thereby disengaging the pump from the reciprocating rod 15. The pump may then be withdrawn bodily from the supports 29. The leg 32 of the U-shaped pump 24 extends to the center of the can 7, and has a turned down elbow 33, into the lower end of which is threaded a tube 34, the outlet of which is reduced by means of a nozzle 35. Within the cylinder 23 and adjacent the crotch 25, is an air cock 36, by means of which air may be admitted to the pump.

In the operation of the device, the cans 7 are filled with water to a point adjacent the top, as shown in Fig. 2, and the pump is lowered into position with the nozzle 35 disposed just below the surface of the water. Then by throwing the arm 20 into engagement with the reciprocating rod 15, the arm will ride up the incline 18 and fall into position between the sleeves 17, which movement will cause the piston rod 21 to reciprocate with the rod 15. It will be noted that this pump is a single-acting pump, and the effect of the reciprocating piston 22 will be to draw the water into the pump, and on the return stroke to force the water through the nozzle 35 to the bottom of the can, that is, to the coldest portion thereof. The effect of this agitation is to dissolve all air bubbles, and it has been found that the forcing of the water to the bottom facilitates the rapidity with which the can of water is frozen.

While a preferred embodiment of the invention has been described, it is to be understood that many changes could be made in the above construction and many apparently widely different embodiments of this invention could be made without departing from the scope thereof. It is intended that all matters contained herein in the above description or shown in the accompanying drawings, shall be interpreted as illustrative and not in a limiting sense. It is also to be understood that the language used in the following claims is intended to cover the full scope of the invention, and is not to be given any narrower construction than the prior art demands, and that materials, sizes and relativities of parts are non-essential, except as called for in the claims.

Having thus described my invention, I claim as new and desire to secure by Letters Patent:

1. In a water agitator, a pump having a nozzle disposed below the surface of the water, an arm pivoted to the piston rod of said pump, and a reciprocating rod, said reciprocating rod having spaced-apart sleeves rigidly mounted thereon, said arm adapted to be removably positioned between said sleeves, said sleeves having outer inclined surfaces whereby said arm may ride up one of said inclined surfaces to be automatically positioned between said sleeves.

2. In a water agitator, a pump adapted to agitate the water by drawing the same into said pump and ejecting the water below the surface thereof, and an air cock in said pump adapted to admit or exhaust the air in said pump, thereby to regulate the force of the ejection of said water.

3. In a water agitator, a U-shaped pump body having a depending nozzle extending from one arm thereof, a reciprocating piston located in the other arm, a reciprocating rod parallel to said latter arm, and means for removably connecting said piston with said reciprocating rod.

In testimony whereof I have signed my name to this specification in the presence of two subscribing witnesses.

TIMOTHY FRANKLIN PHARO.

Witnesses:
HARVEY E. PHARO,
WILLIAM C. SAWYER.